United States Patent
Yoshii et al.

(10) Patent No.: US 6,966,662 B2
(45) Date of Patent: Nov. 22, 2005

(54) REFLECTOR AND LIQUID CRYSTAL DISPLAY DEVICE

(75) Inventors: Katsumasa Yoshii, Fukushima-ken (JP); Chie Chikira, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/752,939

(22) Filed: Jan. 6, 2004

(65) Prior Publication Data

US 2004/0141114 A1    Jul. 22, 2004

(30) Foreign Application Priority Data

Jan. 10, 2003    (JP)    ............................ 2003-004533

(51) Int. Cl.[7] ................................................ G02B 5/10
(52) U.S. Cl. ...................... 359/869; 359/627; 349/67; 362/346
(58) Field of Search ................................ 359/850, 855, 359/868, 869, 599, 627, 628; 362/346, 349; 349/67, 113

(56) References Cited

U.S. PATENT DOCUMENTS

| | | | |
|---|---|---|---|
| 4,991,940 A | * | 2/1991 | Dalisa et al. ................ 349/113 |
| 5,841,496 A | * | 11/1998 | Itoh et al. .................... 349/113 |
| 6,081,376 A | * | 6/2000 | Hansen et al. ............... 359/485 |
| 6,199,992 B1 | * | 3/2001 | Tanada ......................... 359/858 |
| 6,204,903 B1 | * | 3/2001 | Hayashi et al. ............. 349/113 |
| 6,219,120 B1 | * | 4/2001 | Sasaki et al. ................ 349/113 |

FOREIGN PATENT DOCUMENTS

JP    2000-047207    2/2000

* cited by examiner

Primary Examiner—Mark A. Robinson
(74) Attorney, Agent, or Firm—Brinks Hofer Gilson & Lione (57) ABSTRACT

A reflector having light diffusibility for suppressing a reflected image within a wide viewing angle range and having a particular brightness at a specific viewing angle range, and a reflective liquid crystal display device using the reflector, are provided. The reflector 1 comprises a plurality of light-reflective concave portions 3, which are formed on a surface S of a substrate, wherein each of the concave portions 3 is formed with a first curved surface $A_1$ located at one peripheral portion $S_1$ of the concave portion 3 and a second curved surface $B_1$ located at the other peripheral portion $S_2$ thereof, the deepest point $D_1$ is located on the first curved surface $A_1$, and the maximum value $\sigma b_1$ of the absolute value of the second curved surface $B_1$ to the surface S of the substrate is larger than that of the maximum value $\sigma a_1$ of the absolute value of the first curved surface $A_1$ to the surface S of the substrate.

10 Claims, 8 Drawing Sheets

REFLECTOR AND LIQUID CRYSTAL DISPLAY DEVICE

This application claims the benefit of priority to Japanese Patent Application No. 2003-004533, herein incorporated by reference.

BACKGROUND OF THE INVENTION

1. Field of the Invention

The present invention relates to a reflector and a reflective liquid crystal display device, and more particularly to a reflector having characteristics of reflection that enable reflected light observed at a specific viewing angle to be more brightly viewed than light observed at other viewing angles, and a reflective liquid crystal display device using the reflector.

2. Description of the Related Art

In general, a reflective liquid crystal display device which facilitates viewing images by using external light or front light as an illuminating source has been widely used as a display unit for electronic apparatuses such as portable computers, electronic calculators, digital watches, communication apparatuses, game machines, measuring instruments, and electronic boards.

Figure 12:
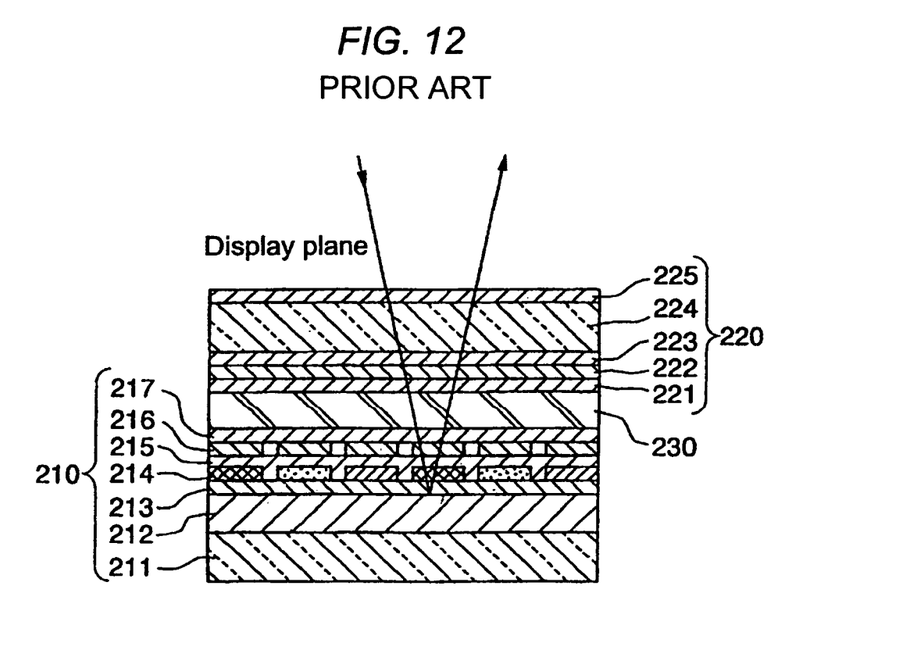
FIG. 12 is a schematic cross-sectional view illustrating the construction of a conventional reflective liquid crystal display device.

The reflective liquid crystal display device schematically comprises a light-transmissive display-side substrate 220 and a reflective reflection-side substrate 210 between which a liquid crystal layer 230 is interposed, as shown in the example in FIG. 12. An outer surface of the display-side substrate 220 is a display plane, and a reflecting layer 212 is provided on the reflection-side substrate 210. In the reflective liquid crystal display device, light which is incident on the display plane passes through the display-side substrate 220 and the liquid crystal layer 230, and reflects on the reflecting layer 212 of the reflection-side substrate 210. In turn, reflected light passes through the liquid crystal layer 230 and is emitted from the display plane, so that an image can be viewed.

Referring to FIG. 12, the reflection-side substrate 210 is constructed, from bottom to top, with a glass substrate 211, the reflecting layer 212, an interposing layer 213, a color filter layer 214, a planarized layer 215, a transparent electrode 216 made of ITO (indium tin oxide) film or NESA film, and an alignment layer 217. In addition, the display-side substrate 220 which is disposed to face the display plane through the liquid crystal layer 230, is constructed with an alignment layer 221, an insulating layer 222, a transparent electrode 223 made of ITO film or NESA film, a glass substrate 224, and an optical modulating layer (a polarizing plate, a phase difference plate, etc.) 225, being stacked in this order from the liquid crystal layer 230.

The reflecting layer 212 of the reflection-side substrate 210 may be roughly classified as either a smooth reflecting type or a diffusive reflecting type. In a smooth reflecting type, the reflecting plane of the reflecting layer 212 is smoothly finished, so that the incident angle (absolute value) and the emitting angle (absolute value) are the same based on the normal line, which is perpendicular to the display plane. Accordingly, as observed with display planes, there is a problem in that irregularity of brightness of the display plane occurs due to the relationship between the location of the light source and the location of the viewing point, In addition, there is another problem in that the light source or the observer's face occurs as a reflected image, thereby diminishing visibility.

Figure 13:
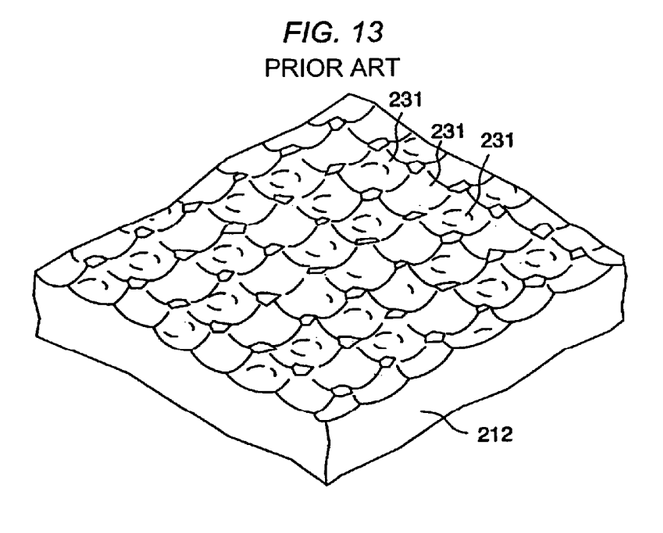
FIG. 13 is a perspective view illustrating some portions of a conventional reflector.

In order to solve the above-mentioned problems, in a diffusive reflecting type, a plurality of minute concave/convex portions (concave portions 231 in FIG. 13) are disposed to be irregularly adjacent to the reflecting surface of the reflecting layer 212, as shown in FIG. 13. For this reason, in the diffusive reflecting type, external light which is incident at a predetermined angle is subjected to irregular reflection at the surface of the reflecting layer 212, and then the reflected light is diffused, and thus brightness is not greatly variant as the viewing point is shifted and a little of the reflected image occurs, so that the so-called wide-viewing-angle reflective liquid crystal display device can be implemented.

Figure 14:
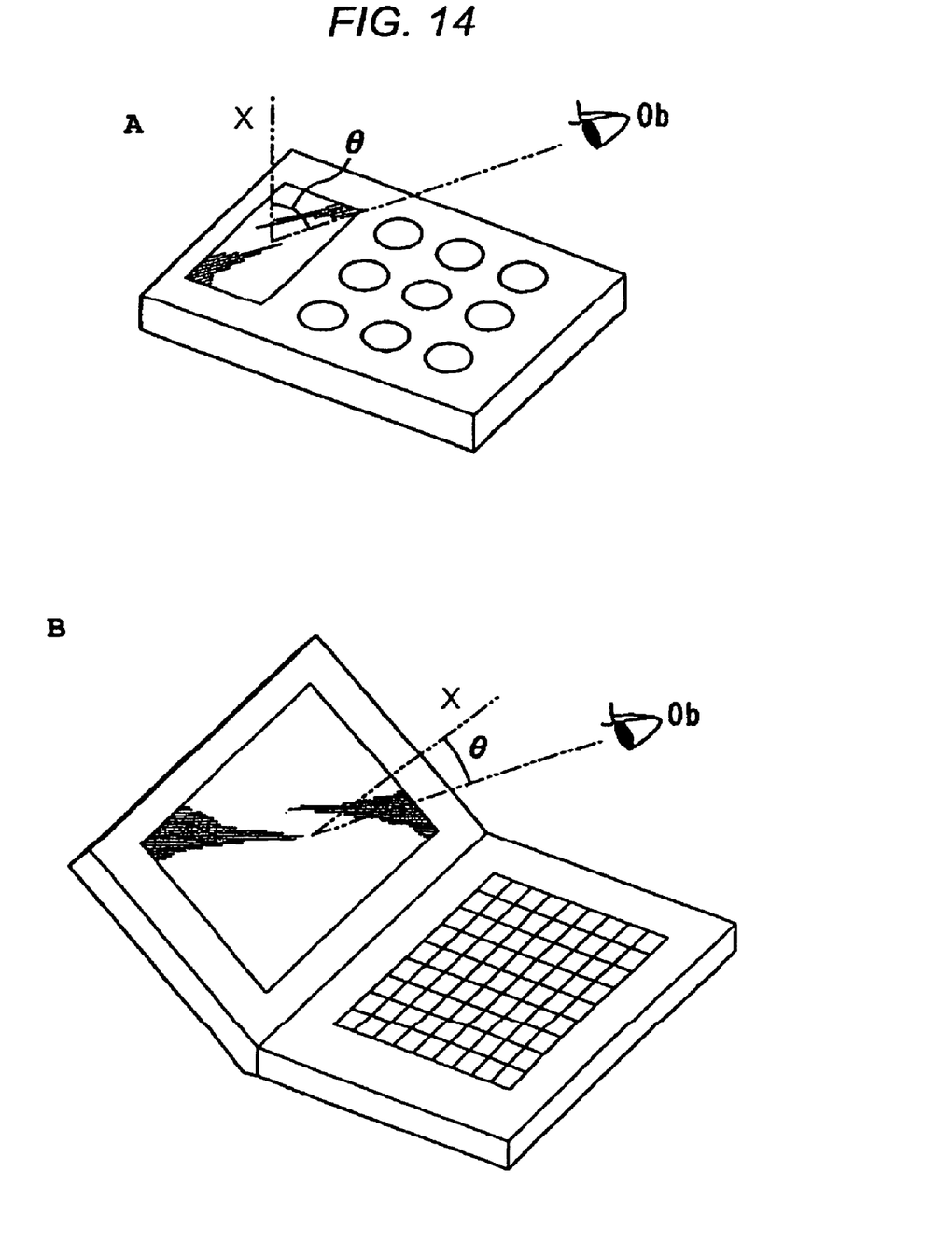
FIG. 14A is a perspective view illustrating a viewing angle in a table electronic calculator being viewed with eyes.
FIG. 14B is a perspective view illustrating a viewing angle in a portable computer being viewed with eyes.

However, in such electronic apparatuses as table electronic calculators or portable computers, as shown in FIG. 14A regarding an example of the table calculator and in FIG. 14B regarding an example of the portable computer, the observer mainly views the display plane from a downwardly sloped direction. In other words, the viewing point Ob is downwardly-sloped from the display plane by an angle of θ to the normal line X, which is perpendicular to the display plane.

On the other hand, in a reflective liquid crystal display device, there are many cases in which illumination is performed by using external light, and external light is drastically attenuated in the course of reciprocally passing through an optical modulating layer 225 such as a polarizing plate, two layers of transparent electrodes 216 and 223, the liquid crystal layer-230, and other layers. In a diffusive liquid crystal display device, since incident light is widely diffused by the reflecting layer 212, the display screen at the viewing point Ob becomes relatively dark, in general. For this reason, if the amount of external light is small, visibility may be drastically diminished. In particular, in a conventional reflective liquid crystal display device, since the shape and locations of concave portions are designed to suppress variation of brightness according to the viewing angle as much as possible, there is a problem in that sufficient brightness can not be obtained when viewing in a specific viewing angle range, that is, a downwardly-sloped range to the normal line. In addition, even when using front light, there are the same problems of attenuation and diffusion of light as when using external light. Therefore, it is difficult to ensure sufficient brightness within a specific viewing angle range without uselessly increasing power consumption for illumination. On the other hand, in a reflective liquid crystal display device, there are many cases in which illumination is performed by using external light, and external light is drastically attenuated in the course of reciprocally passing through an optical modulating layer 225 such as a polarizing plate, two layers of transparent electrodes 216 and 223, the liquid crystal layer 214, and other layers. In a diffusive liquid crystal display device, since incident light is widely diffused by the reflecting layer 212, the display screen at the viewing point Ob becomes relatively dark, in general. For this reason, if the amount of external light is small, visibility may be drastically diminished. In particular, in a conventional reflective liquid crystal display device, since the shape and locations of concave portions are designed to suppress variation of brightness according to the viewing angle as much as possible, there is a problem in that sufficient brightness can not be obtained when viewing in a specific viewing angle range, that is, a downwardly-sloped range to the normal line. In addition, even when using front light, there are the same problems of attenuation and diffusion of light as when using external light. Therefore, it is difficult to ensure sufficient brightness within a specific viewing angle range without uselessly increasing power consumption for illumination.

Accordingly, a reflective liquid crystal display device capable of suppressing a reflected image within a wide viewing angle range and viewing a particularly bright display screen at a specific viewing angle has been needed.

SUMMARY OF THE INVENTION

The present invention is contrived to solve the aforementioned problems. An object of the present invention is to provide a reflector having light diffusibility for suppressing a reflected image within a wide viewing angle range and a particularly high brightness at a specific viewing angle, as well as, a reflective liquid crystal display device using the reflector.

In order to achieve the object, the present invention provides the following aspects.

An aspect of the present invention provides a reflector which comprises a plurality of light-reflective concave portions formed on the surface of a substrate, wherein each of the concave portions is formed with a first curved surface located at one peripheral portion of the concave portion and a second curved surface located at the other peripheral portion of the concave portion, the deepest point of the concave portion is located on the first curved surface, the maximum value of the absolute value of the second curved surface to the surface of the substrate is larger than that of the first curved surface.

According to the reflector, the plurality of light-reflective concave portions is provided on the surface of the substrate, each of the concave portions is formed with the first and second curved surfaces (concave surfaces), and the deepest point of the concave portion is located on the first curved surface, so that it is possible to ensure a wide bright display range by improving light diffusibility, and to suppress reflected images.

Another aspect of the present invention provides a reflector which is the aforementioned reflector, wherein each of the concave portions comprises a specific longitudinal section which passes though the deepest point of the concave portion, the specific longitudinal section has an inner shape which is defined by a first delimiting line delimiting the first curved surface and a second delimiting line delimiting the second curved surface, the first delimiting line extends from one peripheral portion through the deepest point to the boundary between the first and second curved surfaces, the second delimiting line is continuous with the first delimiting line and extends from the boundary between the first and second curved surfaces to the other peripheral portion, and the maximum value of the absolute value of the tilt angle of the second delimiting line to the surface of the substrate is larger than that of the first delimiting line.

According to the reflector, on the specific longitudinal section, the first delimiting line passes through the deepest point and then connects to the second delimiting line, and the slope of the second delimiting line is relatively steep and the slope of the first delimiting line is relatively gradual, so that the first delimiting line is longer than the second delimiting line. For this reason, a greater amount of light which is incident on the first delimiting line than to the second delimiting line is reflected. As a result, more light is reflected on the first curved surface than on the second curved line, so that light diffusibility can be improved.

In addition, since the slope of the second delimiting line is relatively steep, light which is incident on the second delimiting line is reflected at an angle greater than the incident angle to the surface of the substrate, so that a region having high-reflectivity can be obtained at a higher angle than a common viewing angle.

Another aspect of the present invention provides a reflector which is the aforementioned reflector, wherein a third curved surface is formed on the first curved surface, and wherein the maximum value of the absolute value of the tilt angle of the third curved surface to the surface of the substrate is different from that of the first curved surface.

Another aspect of the present invention provides a reflector which is the aforementioned reflector, wherein a third delimiting line delimiting the third curved surface dividing the first delimiting line is formed on a specific longitudinal section.

In the case of the third curved surface being provided on the first curved surface, the amount of reflected light can be increased in a direction corresponding to the tilt angle of the third curved surface. As a result, reflectivity at a specific reflecting angle can be increased.

Another aspect of the present invention provides a reflector which is the aforementioned reflector, wherein the first delimiting line is a concave line and the second delimiting line is a concave line or a substantially straight line.

Another aspect of the present invention provides a reflector which is the aforementioned reflector, wherein the third delimiting line is a concave line or a substantially straight line.

In the case of the second delimiting line being a straight line, light which is incident on the second delimiting line is condensed in the direction of a specific reflecting angle, so that reflectivity at a lower angle can be increased.

In the case of the second delimiting line being a concave curved line, light which is incident on the second delimiting line is diffusively reflected within a relatively wide range, so that the amount of reflected light can be increased at a higher angle as well as a lower angle, and wide bright display characteristics can be obtained by increasing the light diffusibility of reflected light.

Similarly, in the case of the third delimiting line being a substantially straight line, light which is incident on the third delimiting line is condensed in the direction of a specific reflecting angle, so that reflectivity within a specific range can be increased.

In the case of the third delimiting line being a concave curved line, light which is incident on the third delimiting line is diffusively reflected within a relatively wide range, so that wide bright display characteristics can be obtained.

In the reflector according to the present invention, it is preferable that all of the specific longitudinal sections of the concave portions have the same direction, and that all of the second curved lines be aligned in a single direction.

As a result, in the overall reflector, reflectivity in the direction reflected on the second curved surface, which is the surface near the second delimiting line can be increased. In other words, characteristics of reflectivity, in which light directed along a specific direction is highly condensed, can be obtained.

In the reflector according to the present invention, it is preferable that the maximum value of the absolute value of the tilt angle of the first delimiting line to the surface of the substrate be in a range between 4° and 35°.

In the reflector according to the present invention, it is preferable that the maximum value of the absolute value of the tilt angle of the second delimiting line to the surface of the substrate be in a range between 5° and 90°.

In the reflector according to the present invention, it is preferable that the maximum value of the absolute value of the tilt angle of the third delimiting line to the surface of the substrate be in a range between 5° and 20°.

In the reflector according to the present invention, it is preferable that the depths of the plurality of concave portions be irregularly formed to be in a range between 0.1 µm and 3 µm.

In the case of the depth of the concave portion being below 0.1 µm, the effect of light scattering is insufficient. In the case of the depth being above 3 µm, the thickness of the substrate must be at its maximum value in order to obtain the depth, which is not suitable for manufacture and products. In the case of the plurality of concave portions being irregularly provided, the moiré fringes which occurs due to interference of light easily generated when the plurality of concave portions are regularly disposed can be prevented. Also, peak condensation of the amount of light at a specific viewing angle can be alleviated, so that the amount of the reflected light can gradually vary in a viewing range.

In the reflector according to the present invention, it is preferable that a plurality of concave portions be disposed to be irregularly adjacent.

In the case of the concave portions being apart, since the regions between the concave portions become flat, surface reflectivity can increase and the effect of greatly irregular reflection cannot occur in a limited pixel area; therefore, it is preferable that a plurality of concave portions be disposed to be adjacent. In addition, in the case of the plurality of concave portions being regularly disposed, since moiré fringe occurs, it is preferable that the plurality of concave portions be irregularly disposed.

Another aspect of the present invention provides a reflective liquid crystal display device equipped with the aforementioned reflectors.

Another aspect of the present invention provides a reflective liquid crystal display device which is the aforementioned reflective liquid crystal display device, wherein all of the specific longitudinal sections of the concave portions have the same direction, all of the first delimiting lines are aligned in a single direction, and in each of the concave portions, the first delimiting line is located below the second delimiting line, as viewed from an observer's side.

In the case of the first delimiting lines of all of the concave portions being located below the second delimiting lines as viewed from an observer's side, external light, etc., which is mainly incident from the upper side can be shifted toward the direction of the normal line to the surface of the substrate rather than below the observer's legs.

In addition, since external light, etc., which is mainly incident from the upper side as viewed from an observer's side is effectively incident on the second curved surface which is a surface near the second delimiting line, the total of amount of reflected light can be increased As a result, the amount of light reflected to the observer's viewing direction is increased, so that a reflective liquid crystal display device having a bright screen at a practical viewing point can be implemented.

In particular, in case that it was used as display devices of a portable telephone and a notebook personal computer, the amount of the light reflected to the observer's viewing direction is increased, so that a reflective liquid crystal display device having a bright screen at a practical viewing point can be realized.

DESCRIPTION OF THE PREFERRED EMBODIMENTS

[First Embodiment]

Now, a first embodiment of the present invention will be described in detail, with reference to the accompanying drawings. It should be understood that the embodiments described below do not limit the present invention.

Figure 1:
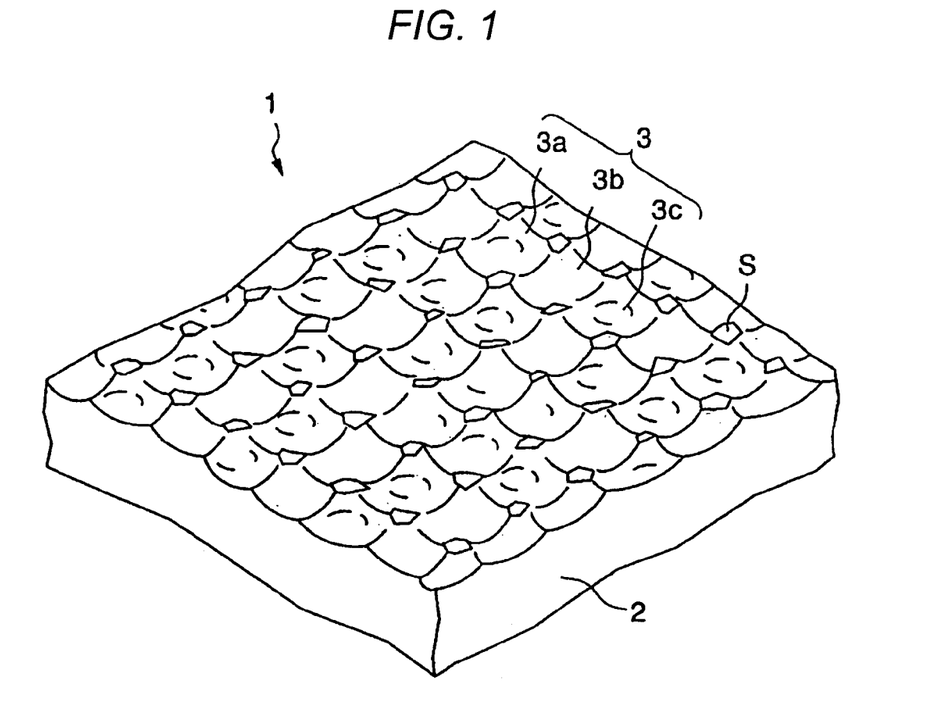
FIG. 1 is a perspective view illustrating some portions of a reflector according to a first embodiment of the present invention.

FIG. 1 is a view illustrating a reflector according to the embodiment. As shown in FIG. 1, the reflector 1 of the embodiment comprises a plurality of reflective concave portions 3a, 3b, 3c, . . . , (hereinafter, generally referred to as 'concave portions 3') which are disposed to be irregularly adjacent on a surface S (a reference surface) of a flat substrate 2 which is made of, for example, aluminum.

Figure 2:
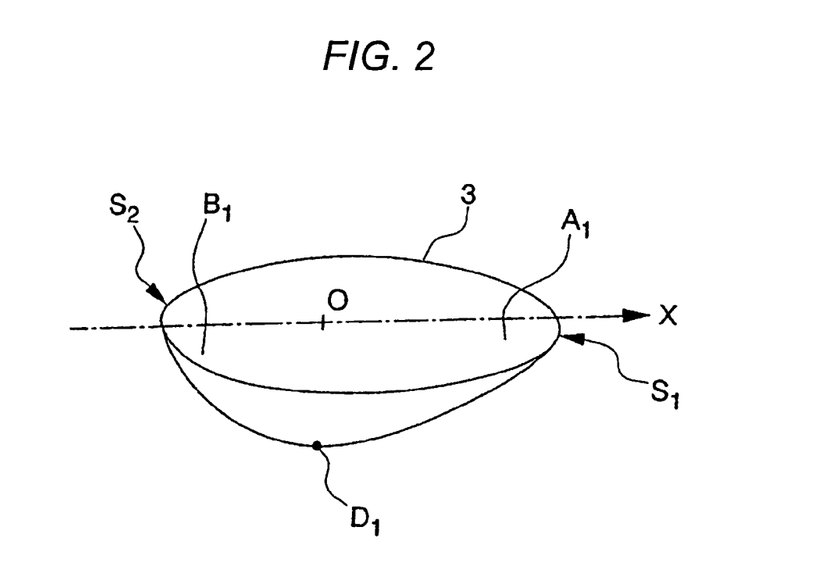
FIG. 2 is a perspective view illustrating a concave portion of the reflector shown in FIG. 1.
Figure 3:
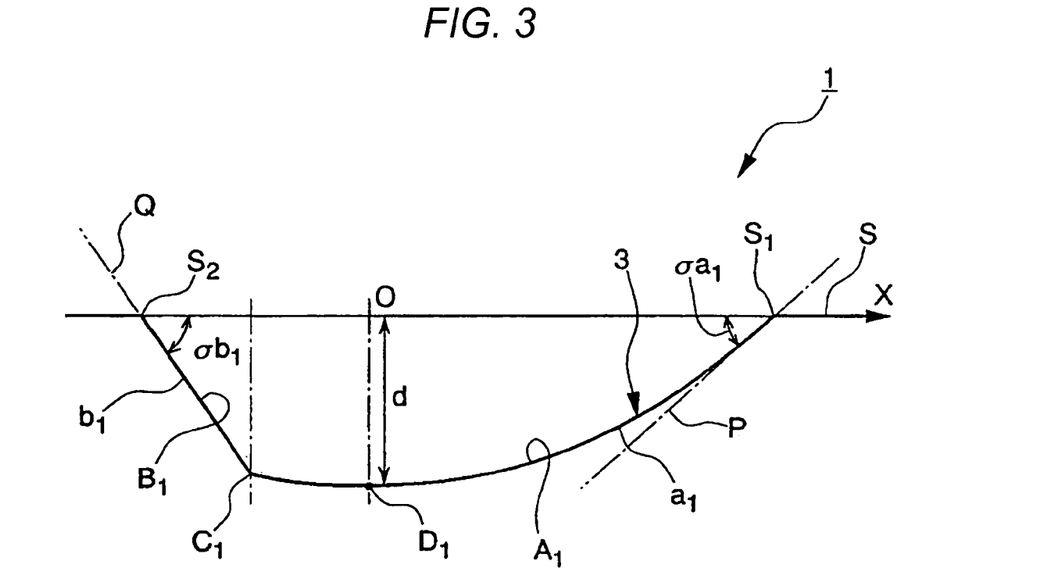
FIG. 3 is a schematic cross-sectional view illustrating a specific longitudinal section of the concave portion shown in FIG. 2.

As shown in a perspective view of FIG. 2 and a cross-sectional view of FIG. 3, each of the concave portions 3 is delimited by a first curved surface $A_1$ located at one peripheral portion $S_1$ and a second curved surface $B_1$ located at the other peripheral portion $S_2$ of the concave portion 3. In addition, the deepest point $D_1$ of the concave portion 3 is located on the first curved surface $A_1$.

As shown in FIG. 3, in a specific longitudinal section X of the concave portion 3, the shape of the section is defined by a first delimiting line $a_1$ delimiting the first curved surface $A_1$ and a second delimiting line $b_1$ delimiting the second curved surface $B_1$. The first delimiting line $a_1$ extends from one peripheral portion $S_1$ through the deepest point $D_1$ to a boundary $C_1$ between the first and second curved surfaces $A_1$ and $B_1$. The second delimiting line $b_1$ is continuous with the first delimiting line $a_1$ and extends from the boundary $C_1$ between the first and second curved surfaces $A_1$ and $B_1$ to the other peripheral portion $S_2$. The first and second delimiting lines $a_1$ and $b_1$ are connected to each other at the boundary $C_1$ which is located near the other peripheral portion $S_2$ rather than at the deepest point $D_1$. The first and second delimiting lines $a_1$ and $b_1$ are slowly continuous with each other at the boundary $C_1$. In addition, the deepest point $D_1$ is located substantially at the center O of the concave portion 3.

The first curved surface $A_1$ is a concave spherical surface (a concave curved surface), and thus, the first delimiting line $a_1$ on the specific longitudinal section X also becomes a concave curved line in accordance with the shape of the first curved surface $A_1$. On the other hand, the second curved surface $B_1$ is a simple concave surface, and thus, the second delimiting line $b_1$ on the specific longitudinal section X becomes a substantially straight line in accordance with the shape of the second curved surface $B_1$.

In addition, the radius of curvature of the first curved surface $A_1$ on the specific longitudinal section X is preferably in a range between 1 $\mu$m and 120 $\mu$m.

The slope of the second delimiting line $b_1$ to the surface of the substrate S is steeper than that of the first delimiting line $a_1$. In other words, the maximum value of the absolute value of the tilt angle of the second delimiting line $b_1$ to the surface S of the substrate is larger than the maximum value of the absolute value of the tilt angle of the first delimiting line $a_1$ to the surface S of the substrate.

In addition, the maximum value $\sigma a_1$ of the absolute value of the tilt angle of the first delimiting line $a_1$ to the surface S of the substrate varies irregularly within a range between 4° and 35°. The maximum value $\sigma b_1$ of the absolute value of the tilt angle of the second delimiting line $b_1$ to the surface S of the substrate varies irregularly within a range between 5° and 90°.

The absolute values of the tilt angles of the first and second delimiting lines $a_1$ and $b_1$ (the first and second curved surfaces $A_1$ and $B_1$) to the surface S of the substrate are the absolute value of angles between the surface S of the substrate and tangential planes P and Q at arbitrary points on the first and second delimiting lines $a_1$ and $b_1$ (the first and second curved surfaces $A_1$ and $B_1$), as shown in FIG. 3.

In addition, the maximum values $\sigma a_1$ and $\sigma b_1$ of the absolute values of the tilt angles of the first and second delimiting lines $a_1$ and $b_1$ (the first and second curved surfaces $A_1$ and $B_1$) to the surface S of the substrate means the maximum angle among the tilt angles of the tangential planes P and Q at arbitrary points on the first and second delimiting lines $a_1$ and $b_1$ (the first and second curved surfaces $A_1$ and $B_1$).

Each of the concave portions 3 has a single deepest point D (a point having a tilt angle of zero on the curved surface) on its concave surface. In addition, the depth d of the concave portion 3 is the distance between the deepest point $D_1$ and the surface S of the substrate. The depths d of the concave portions 3a, 3b, 3c, . . . , varies irregularly within a range between 0.1 $\mu$m and 3 $\mu$m.

In the embodiment, all of the specific longitudinal sections X of the concave portions 3a, 3b, 3c, . . . , have the same direction. In addition, all of the second delimiting lines $b_1$ are aligned in a single direction. In other words, all of the concave portions have the same x direction, as shown in FIGS. 2 and 3.

Figure 4:
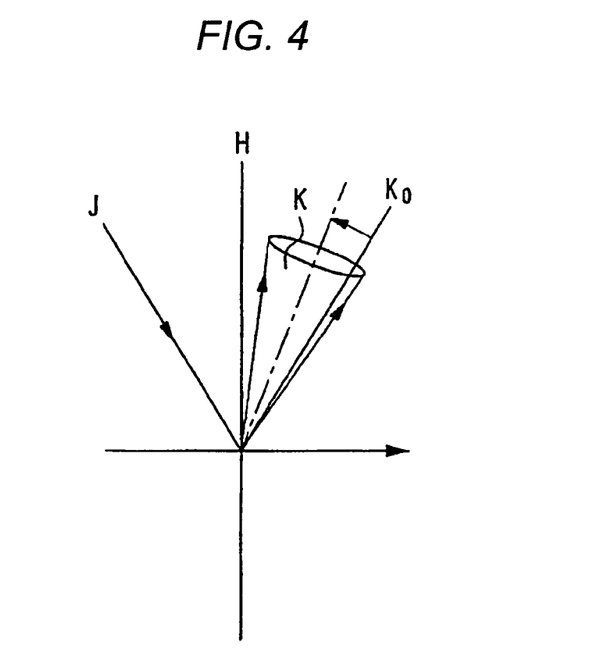
FIG. 4 is a view for explaining the characteristics of reflection of the reflector.

Since all of the second delimiting lines $b_1$ of the reflector according to the embodiment are formed to align in a single direction, in the characteristics of reflection, reflected light deviates from the direction of regular reflection on the surface S of the substrate, as shown in FIG. 4.

Namely, as shown in FIG. 4, reflected light K corresponding to light J, which is incident from a direction upwardly sloped to the opposite direction of x, and its corresponding bright display region are shifted further toward the direction H of the surface S of the substrate rather than toward the direction K0 of regular reflection.

As a result, in the characteristics of the overall reflection on the specific longitudinal section X, the amount of light which is incident on a region associated with the first delimiting line $a_1$ is greater than the amount of light which is incident on a regions associated with the second delimiting line $b_1$. Since more light is reflected on the first curved surface $A_1$, light diffusibility can be increased.

Since the slope of the second delimiting line $b_1$ is relatively steep, the light which is incident on the region associated with the second delimiting line $b_1$ is reflected with a larger angle than the incident angle to the surface S of the substrate, and thus, high-reflectivity region can be formed at a higher angle than the general viewing angle, which ranges between 0° and 30°.

Figure 5:
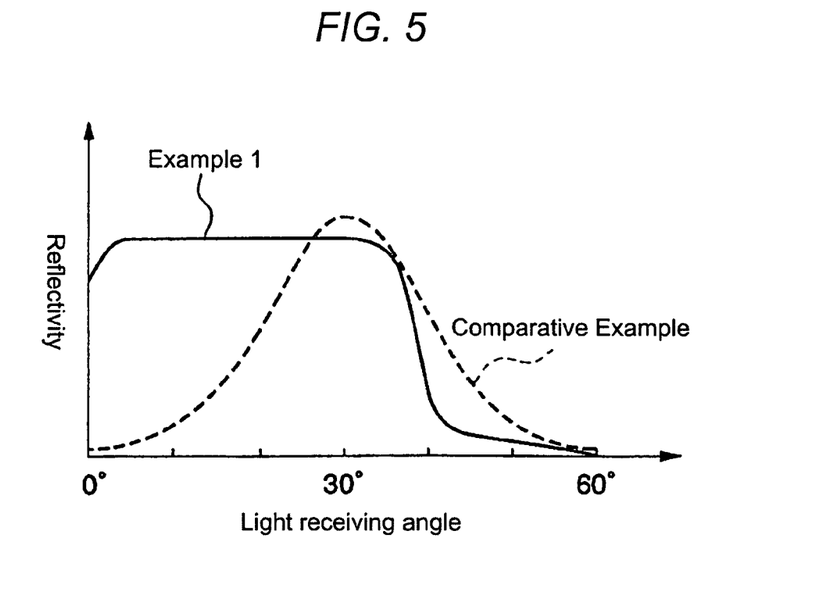
FIG. 5 is a graph illustrating the relationship between the receiving angle and reflectivity of the reflector shown in FIG. 1.

FIG. 5 illustrates the relationship between the receiving angle ($\theta$°) and brightness (reflectivity) when external light having an incident angle of is illuminated on the display plane of the reflector 1 of the embodiment (the first example) and the receiving angle varies from the angle of a vertical line (0°) to an angle of 60°, by centering at the angle of 30° which corresponds to the direction of regular reflection on the display plane (the surface of the substrate). FIG. 5 also illustrates a comparative example of the relationship between the receiving angle and reflectivity in a reflective liquid crystal display device which utilizes a conventional reflector having spherical, concave portions.

In addition, in the first example, the radius of curvature of the first curved surface $A_1$, the tilt angle $\sigma a_1$ of the first delimiting line $a_1$, the distance between the deepest point $D_1$ and the boundary $C_1$ in FIG. 3, the tilt angle $\sigma b_1$ of the second delimiting line $b_1$, and the depth from the surface S of the substrate to the deepest point $D_1$ are set to 20 $\mu$m, 20°, 1.5 $\mu$m, 60°, and 1.2 $\mu$m, respectively.

As apparent from FIG. 5, the profile of reflectivity of the comparative example has a Gaussian distribution of which the center is located at a receiving angle of about 30°, while the reflector 1 of the embodiment (the first example) has a substantially uniform reflectivity within a range between about 5° and about 35° and a steeply-slopped reflectivity angle of 40°.

This is because the second delimiting line $b_1$ is formed to have a steeper slope than the first delimiting line $a_1$. As a result, reflectivity in the lower angle range between 5° and 30° is increased to the same extent as reflectivity in the higher angle range above 40° is decreased.

In addition, the first delimiting line $a_1$ is connected to the second delimiting line $b_1$ through the deepest point $D_1$. The slope of the second delimiting line $b_1$ is relatively steep and the slope of the first delimiting line $a_1$ is relatively gradual. As a result, the first delimiting line $a_1$ is longer than the second delimiting line $b_1$. For this reason, the amount of the light which is incident on the region associated with the first delimiting line $a_1$ is greater than the amount of the light which is incident on the region associated with the second delimiting line $b_1$, and thus, more light is reflected on the first curved surface $A_1$, so that reflectivity can be high in a wide range between 5° and 30°.

As a result, it is possible to obtain sufficient brightness at a viewing angle between 5° and 30° in the reflector 1 of the embodiment.

[Second Embodiment]

Now, a second embodiment of the present invention will be described in detail with reference to the accompanying drawings. In the following embodiment, the description of the same portions as those of the first embodiment will be omitted.

Figure 6:
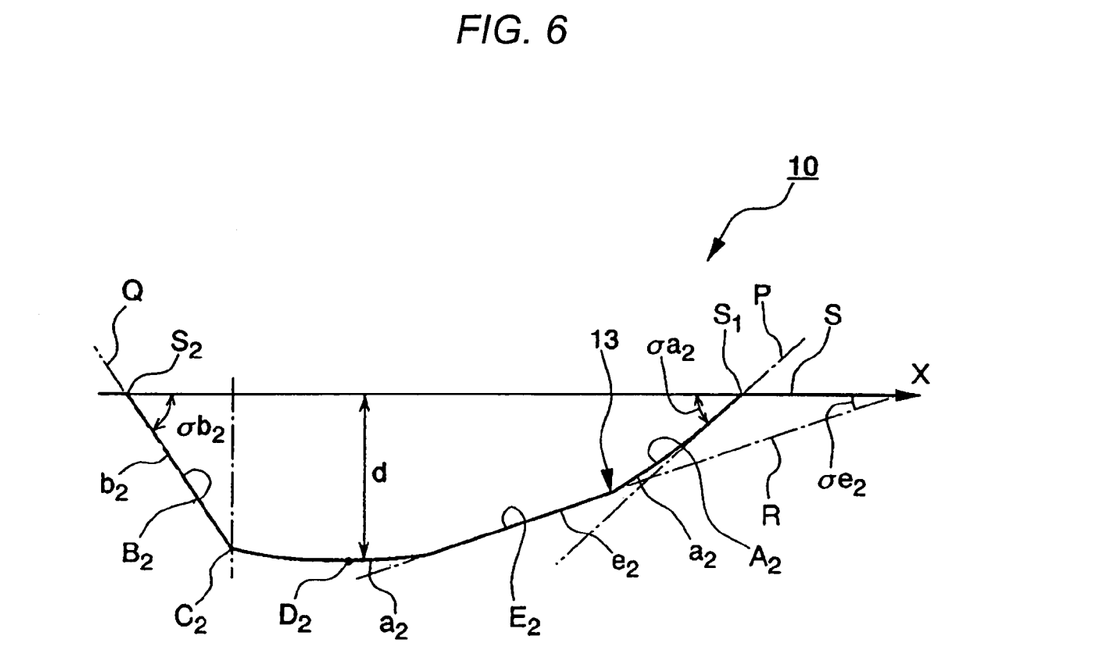
FIG. 6 is a schematic cross-sectional view illustrating a specific longitudinal section of a concave portion of a reflector according to a second embodiment of the present invention.

FIG. 6 is a cross-sectional view illustrating principal portions of the reflector according to the embodiment. Like the reflector 1 of the first embodiment, the reflector 10 of the embodiment comprises a plurality of reflective concave portion 13 which are disposed to be irregularly adjacent on a surface S (a reference surface) of a flat substrate which is made of, for example, aluminum.

As shown in the cross-sectional view of FIG. 6, each of the concave portions 13 is delimited by a first curved surface $A_2$ located at one peripheral portion $S_1$ and a second curved surface $B_2$ located at the other peripheral portion $S_2$. In addition, the deepest point $D_2$ of the concave portion 13 is located on the first curved surface $A_2$.

In a specific longitudinal section X of the concave portion 13, the shape of the section is defined by a first delimiting line $a_2$ delimiting the first curved surface $A_2$ and a second delimiting line $b_2$ delimiting the second curved surface $B_2$. The first delimiting line $a_2$ extends from one peripheral portion $S_1$ through the deepest point $D_2$ to the boundary $C_2$ between the first and second curved surfaces $A_2$ and $B_2$. The second delimiting line $b_2$ is continuous with the first delimiting line $a_2$ and extends from the boundary $C_2$ between the first and second curved surfaces $A_2$ and $B_2$ to the other peripheral portion $S_2$. The first and second delimiting lines $a_2$ and $b_2$ are connected to each other at the boundary $C_2$ which is located near the other peripheral portion $S_2$ rather than at the deepest point $D_2$.

As in the first embodiment, the slope of the second delimiting line $b_2$ to the surface S of the substrate is steeper than that of the first delimiting line $a_2$. In addition, the deepest point $D_2$ is located substantially at the center O of the concave portion 13. As a result, the maximum value of the absolute value of the tilt angle of the second delimiting line $b_2$ to the surface S of the substrate is larger than the maximum value of the absolute value of the tilt angle of the first delimiting line $a_2$ to the surface S of the substrate.

A third curved surface $E_2$, of which the maximum value of the absolute value of the tilt angle to the surface S of the substrate is different from that of the first curved surface $A_2$, is formed on the first curved surface $A_2$. In addition, a third delimiting line $e_2$ delimiting the third curved surface $E_2$ dividing the first delimiting line $a_2$ is formed on the specific longitudinal section shown in FIG. 6. The third curved surface $E_2$ (the third delimiting line $e_2$) is located near one peripheral portion $S_1$ rather than at the deepest point $D_2$ of the concave portion 13.

The first curved surface $A_2$ is a concave spherical surface (a concave curved surface), and thus, the first delimiting line $a_2$ becomes a concave line in accordance with the shape of the first curved surface $A_2$. On the other hand, the second curved surface $B_2$ is a simple concave curved surface, and thus, the second delimiting line $b_2$ becomes a substantially straight line in accordance with the shape of the second curved surface $B_2$.

In addition, the third curved surface $E_2$ is a concave spherical surface having the radius of curvature larger than that of the first curved surface $A_2$. As a result, the third delimiting line $e_2$ becomes a concave curved line in accordance with the shape of the third curved surface $E_2$.

In addition, the radius of curvature of the first curved surface $A_2$ is preferably in a range between 1 μm and 120 μm, and the radius of curvature of the third curved surface $E_2$ is preferably 5 μm or more.

In addition, the maximum value $\sigma a_2$ of the absolute value of the tilt angle of the first delimiting line $a_2$ to the surface S of the substrate varies irregularly within a range between 4° and 35°. The maximum value $\sigma b_2$ of the absolute value of the tilt angle of the second delimiting line $b_2$ to the surface S of the substrate varies irregularly within a range between 5° and 90°. The maximum value $\sigma e_2$ of the absolute value of the tilt angle of the third delimiting line $e_2$ to the surface S of the substrate varies irregularly within a range between 5° and 20°.

In addition, the maximum tilt angle (absolute value) of the second delimiting line $b_2$ is larger than that of the first delimiting line $a_2$.

The first and second delimiting lines $a_2$ and $b_2$ are slowly continuous with each other at the boundary $C_2$ between the first and second delimiting lines $a_2$ and $b_2$, and the first and third delimiting lines $a_2$ and $e_2$ are also slowly continuous with each other In addition, the absolute values of the tilt angles of the first, second, and third delimiting lines $a_2$, $b_2$, and $e_2$ (the first, second, and third curved surfaces $A_2$, $B_2$, and $E_2$) to the surface S of the substrate mean the absolute value of angles between the surface S of the substrate and tangential planes P, Q, and R at arbitrary points on the first, second, and third delimiting lines $a_2$, $b_2$, and $e_2$ (the first, second, and third curved surfaces $A_2$, $B_2$, and $E_2$) The maximum values $\sigma a_2$, $\sigma b_2$, and $\sigma e_2$ of the absolute values of the tilt angles of the delimiting lines $a_2$, $b_2$, and $e_2$ (the curved surfaces $A_2$, $B_2$, and $E_2$) to the surface S of the substrate means the maximum angle among the tilt angles of the tangential planes P and Q at arbitrary points on the delimiting lines $a_2$, $b_2$, and $e_2$ (the curved surfaces $A_2$, $B_2$, and $E_2$).

Figure 7:
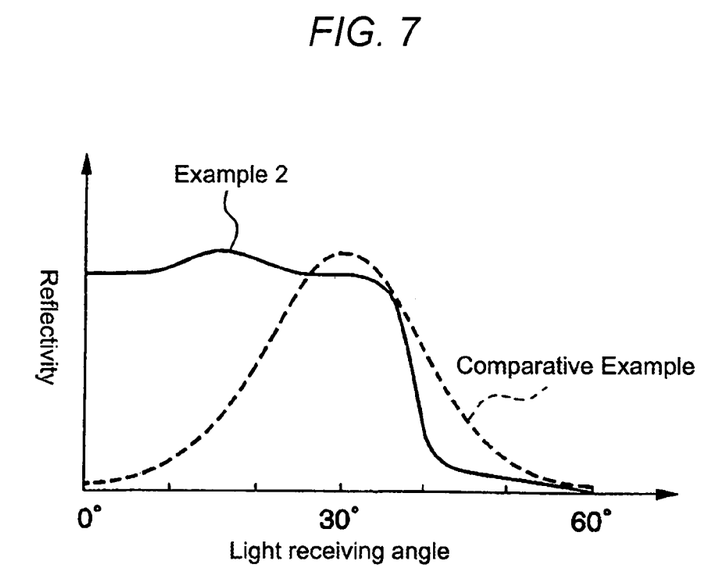
FIG. 7 is a graph illustrating the relationship between the receiving angle and reflectivity of the reflector shown in FIG. 6.

FIG. 7 illustrates the relationship between the receiving angle (θ°) and brightness (reflectivity) when external light having an incident angle of 30° is illuminated on a display plane of the reflector 10 of the embodiment (a second example) and the receiving angle varies from the angle of a vertical line (0°) to an angle of 60°, by centering at the angle of 30° which corresponds to the direction of regular reflection on the display plane (the surface of the substrate) FIG. 7 also illustrates a comparative example of the relationship between the receiving angle and reflectivity in a reflective liquid crystal display device which utilizes a conventional reflector having spherical, concave portions.

In addition, in the second example, the radius of curvature of the first curved surface $A_2$, the tilt angle $\sigma a_2$ of the first delimiting line $a_2$, the distance between the deepest point $D_2$ and the boundary $C_2$ in FIG. 7, the tilt angle $\sigma b_2$ of the second delimiting line $b_2$, the radius of curvature of the third curved surface $E_2$, the tilt angle $\sigma e_2$ of the third delimiting line $e_2$, and the depth d from the surface S of the substrate to the deepest point $D_2$ are set to 20 μm, 20°, 1.5 μm, 60°, 100 μm, 6° to 12°, and 1.2 μm, respectively.

As apparent from FIG. 7, the profile of reflectivity of the comparative example has a Gaussian distribution of which the center is located at a receiving angle of about 30°, while the reflector 10 of the embodiment (the second example) has a substantially uniform reflectivity within a range between about 5° and about 35° and a steeply-sloped reflectivity near an angle of 40°. In addition, in the second embodiment, it is observed that the reflectivity has a higher peak near an angle of 15° as its center.

The reason that reflectivity in the lower angle range between 5° and 30° is increased is that the second delimiting line $b_2$ is formed to have a steeper slope than is the first delimiting line $a_2$. As a result, reflectivity in the lower angle range between 5° and 30° is increased to the same extent as reflectivity in the higher angle range above 40° is decreased.

In addition, since the first delimiting line $a_2$ is longer than the second delimiting line $b_2$, the amount of light which is incident on the region associated with the first delimiting line $a_2$ is greater than the amount of light which is incident on the region associated with the second delimiting line $b_2$. Therefore, more light is reflected on the first curved surface $A_2$, so that reflectivity can be high in a wide range between 5° and 30°.

In addition, the reason that the observed reflectivity has a higher peak near the angle of 15° as its center is that a third curved surface $E_2$ is formed. By providing a third curved surface $E_2$, it is possible to increase brightness at a further viewing angle.

As a result, it is possible to obtain sufficient brightness at a viewing angle between 5° and 30° and higher brightness near the angle of 15° in the reflector 10 of the embodiment.

[Third Embodiment]

Now, a third embodiment of the present invention will be described in detail with reference to the accompanying drawings. In the following embodiment, the description of the same portions as those of the first embodiment will be omitted.

Figure 8:
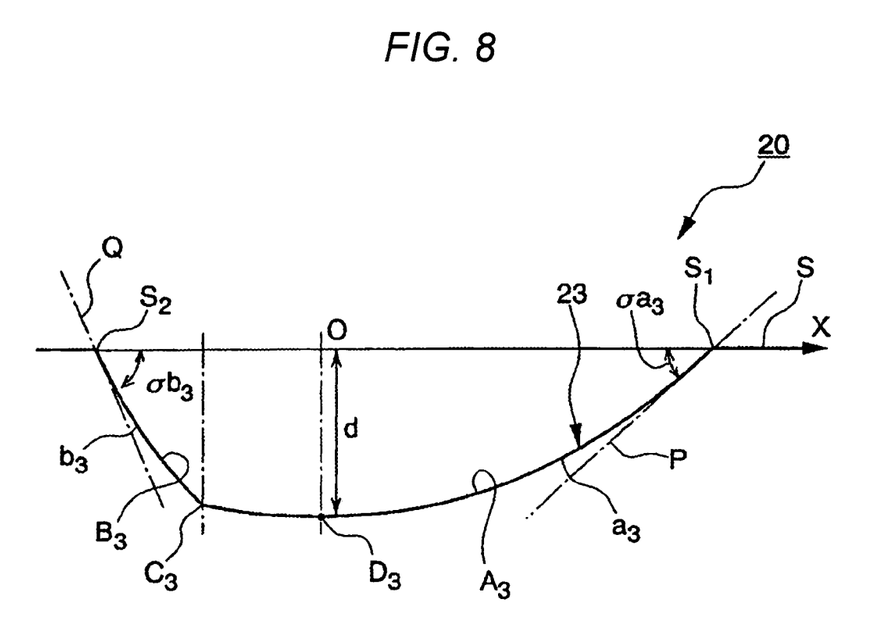
FIG. 8 is a schematic cross-sectional view illustrating a specific longitudinal section of a concave portion of the reflector according to a third embodiment of the present invention.

FIG. 8 is a cross-sectional view illustrating principal portions of a reflector according to the embodiment. Like the reflector 1 of the first embodiment, the reflector 20 of the embodiment comprises a plurality of reflective concave portions 23 . . . which are disposed to be irregularly adjacent on a surface S (a reference surface) of a flat substrate which is made of, for example, aluminum.

As shown in the cross-sectional view of FIG. 8, each of the concave portions 23 is delimited by a first curved surface $A_3$ located at one peripheral portion $S_1$ and a second curved surface $B_3$ located at the other peripheral portion $S_2$. In addition, the deepest point $D_3$ of the concave portion 23 is located on the first curved surface $A_3$.

In a specific longitudinal section X of the concave portion 23, the shape of the section is defined by a first delimiting line $a_3$ delimiting the first curved surface $A_3$ and a second delimiting line $b_3$ delimiting the second curved surface $B_3$. The first delimiting line $a_3$ extends from one peripheral portion $S_1$ though the deepest point $D_3$ to the boundary $C_3$ between the first and second curved surfaces $A_3$ and $B_3$. The second selimiting line $b_3$ delimiting the second curved surface $B_3$ is continuous with the first selimiting line $a_3$ and extends from the boundary $C_3$ between the first and second curved surfaces $A_3$ and $B_3$ to the other peripheral portion $S_2$. The first and second selimiting lines $a_3$ and $b_3$ are connected to each other at the boundary $C_3$ which is located near the other peripheral portion $S_2$ rather than at the deepest point $D_3$.

As in the first embodiment, the slope of the second delimiting line $b_3$ to the surface S of the substrate is steeper than that of the first delimiting line $a_3$. In addition, the deepest point $D_3$ is located substantially at the center O of the concave portion 23. As a result, the maximum value of the absolute value of the tilt angle of the second delimiting line $b_3$ to the surface S of the substrate is larger than the maximum value of the absolute value of the tilt angle of the first delimiting line $a_3$ to the surface S of the substrate.

The first curved surface $A_3$ is a concave spherical surface (a concave curved surface), and thus, the first delimiting line $a_3$ becomes a concave line in accordance with the shape of the first curved surface $A_3$. On the other hand, the second curved surface $B_3$ is also the concave spherical surface (the concave curved surface), and thus, the second delimiting line $b_3$ becomes the concave line in accordance with the shape of the second curved surface $B_3$.

In addition, the radius of curvature of the first curved surface $A_3$ is preferably in a range between 1 μm and 120 μm, and the radius of curvature of the second curved surface $B_3$ is preferably 5 μm or more.

In addition, the preferable ranges of the maximum values $\sigma a_3$ and $\sigma b_3$ of the absolute values of the tilt angles of the first and second delimiting lines $a_3$ and $b_3$ to the surface of the substrate are the same as those of the first embodiment.

In addition, the definition of the absolute values of the tilt angles of the first and second delimiting lines $a_3$ and $b_3$ (the first and second curved surfaces $A_3$ and $B_3$) to the surface S of the substrate are the same as those of the first embodiment.

Figure 9:
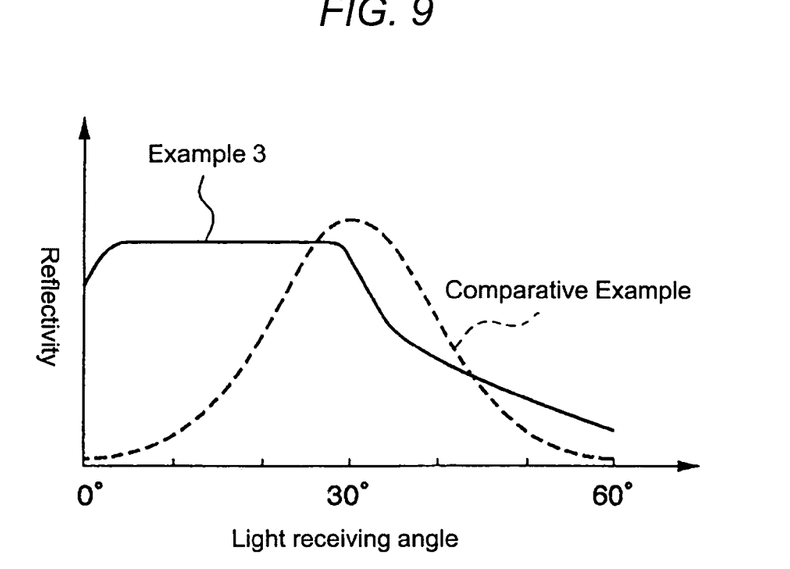
FIG. 9 is a graph illustrating the relationship between the receiving angle and reflectivity of the reflector shown in FIG. 8.

FIG. 9 illustrates the relationship between the receiving angle (θ°) and brightness (reflectivity) when external light having an incident angle of 30° is illuminated on a display plane of the reflector 20 of the embodiment (a third example) and the receiving angle varies from the angle of a vertical line (0°) to the angle of 60°, by centering at the angle of 30° which corresponds to the direction of regular reflection on the display plane (the surface of the substrate). FIG. 9 also illustrates a comparative example of the relationship between the receiving angle and reflectivity in a reflective liquid crystal display device which utilizes a conventional reflector having spherical, concave portions.

In addition, in the third example, the radii of curvature of the first and second curved surface $A_3$ and $B_3$, the tilt angle $\sigma a_3$ of the first delimiting line $a_3$, the distance between the deepest point $D_3$ and the boundary $C_3$ in FIG. 8, the tilt angle $\sigma b_3$ of the second delimiting line $b_3$, and the depth from the surface S of the substrate to the deepest point $D_1$ are set to 20 μm, 20°, 1.5 μm, 60°, and 1.2 μm, respectively.

As apparent from FIG. 9, the profile of reflectivity of the comparative example has a Gaussian distribution of which the center is located at a receiving angle of about 30°, while the reflector 20 of the embodiment (the third example) has a substantially uniform reflectivity within a range between about 5° and about 35°, a gradually-sloped reflectivity from 40° to 60°, and a relatively higher reflectivity than that of the comparative example above an angle of 40°.

The reason that reflectivity in the lower angle range between 5° and 30° is increased is that the second delimiting line $b_3$ is formed to have a steeper slope than is the first delimiting line $a_3$. As a result, reflectivity in the lower angle range between 5° and 30° is increased to the same extent as reflectivity in a higher angle range above 40° is decreased.

In addition, since the first delimiting line $a_3$ is longer than the second delimiting line $b_3$, the amount of light which is incident on the region associated with the first delimiting line $a_3$ is greater than the amount of light which is incident on the region associated with the second delimiting line $b_3$. Therefore, more light is reflected on the first curved surface $A_3$, so that reflectivity can be high in a wide range between 5° and 30°.

In addition, the reason that reflectivity is increased further along the range from 40° to 60° than in that of the comparative example is that the second curved surface $B_3$ is formed to have a concave spherical shape, and thus, light reflected on the second curved surface $B_3$ is diffusively reflected in a relatively wide angle range. In such a manner, by providing a second curved surface $B_3$, it is possible to reflect light in a further wide angle of reflection.

As a result, it is possible to obtain sufficient brightness at a viewing angle between 5° and 30° and a higher brightness than that of the conventional reflector even above the angle of 40° in the reflector 20 of the embodiment.

Although the method of fabricating reflectors 1, 10, and 20 may not be limited to a specific method, the reflectors may be fabricated in the following method, for example.

First, a punch, of which the distal portion has a convex surface corresponding to the aforementioned concave surface, is manufactured. Then, the distal portion of the punch is brought to face an aluminum substrate. While the alignment direction of the punch relative to the aluminum substrate is maintained to be uniform, the entire area of a predetermined region of the aluminum substrate is punched with punch strokes, with the punch interval being irregularly varied. The punch strokes are adjusted, so that the depths of the concave portions may fall within a predetermined range. The punch interval is adjusted, so that moiré fringes cannot occur.

[Fourth Embodiment]

Figure 10:
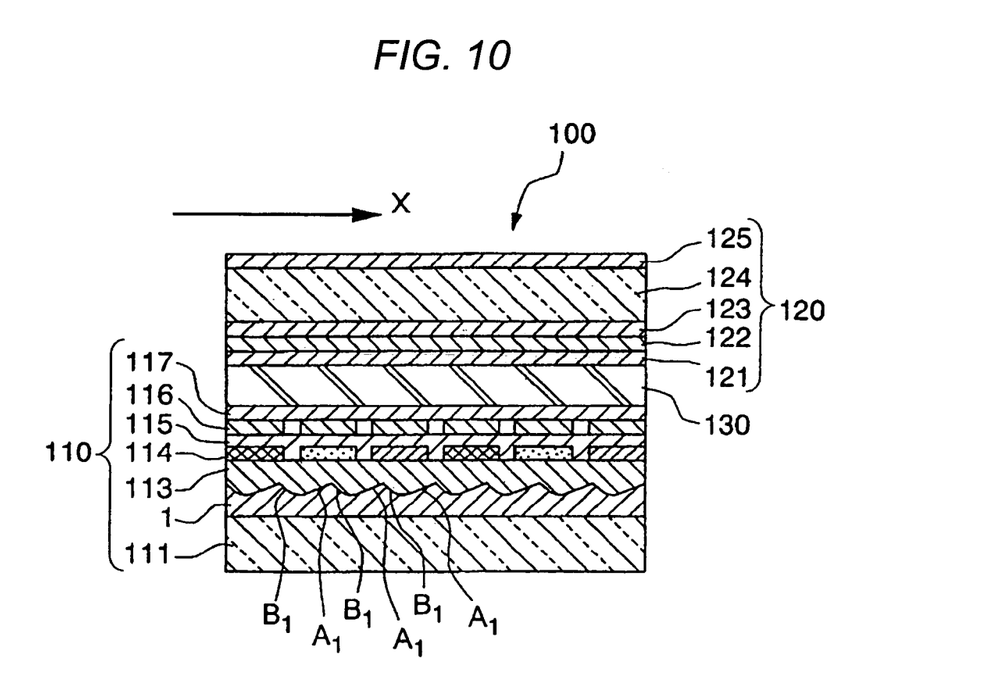
FIG. 10 is a schematic cross-sectional view illustrating the construction of the reflective liquid crystal display device according to a third embodiment of the present invention.

Next, FIG. 10 is a cross-sectional view illustrating the stacked structure of a reflective liquid crystal display device 100 according to a fourth embodiment into which the aforementioned reflectors 1 are assembled.

In FIG. 10, the reflective liquid crystal display device 100 comprises a light-transmissive display-side substrate 120 and a reflective reflection-side substrate 110 between which a liquid crystal layer 130 is interposed. The outer surface of the display-side substrate 120 is a display plane, and a reflector 1 is assembled on the reflection-side substrate 110. The aforementioned reflectors 10 and 20 may be used as a reflector.

The reflection-side substrate 110 is constructed with a glass substrate 111, the reflector 1, a transparent interposing layer 113, a color filter layer 114, a transparent planarized layer 115, and a transparent electrode 116 which are made of ITO (indium tin oxide) film or NESA film, and an alignment layer 117, being stacked in this order from the bottom. In addition, the display-side substrate 120, which is disposed to face the display plane through the liquid crystal layer 130, is constructed with an alignment layer 121, an insulating layer 122, a transparent electrode 123 made of ITO film or NESA film, a glass substrate 124, and an optical modulating layer (a polarizing plate, a phase difference plate, etc.) 125 being stacked in this order from the liquid crystal layer 130.

A simple matrix-type liquid crystal display device is constructed with transparent electrodes 116 and 123 which face each other through the liquid crystal layer 130, are striped, and are perpendicularly intersected to each other, in which the intersection region is used for each of pixels.

In the reflective liquid crystal display device 100, the reflector 1 is mounted, so that the first delimiting line $A_1$ of each of the concave portions 3a, 3b, 3c, . . . , is shifted further to the x direction than is the steeply-tilted second delimiting line $B_1$. Characters, or the like can be displayed in the x direction along the lower side.

Figure 11:
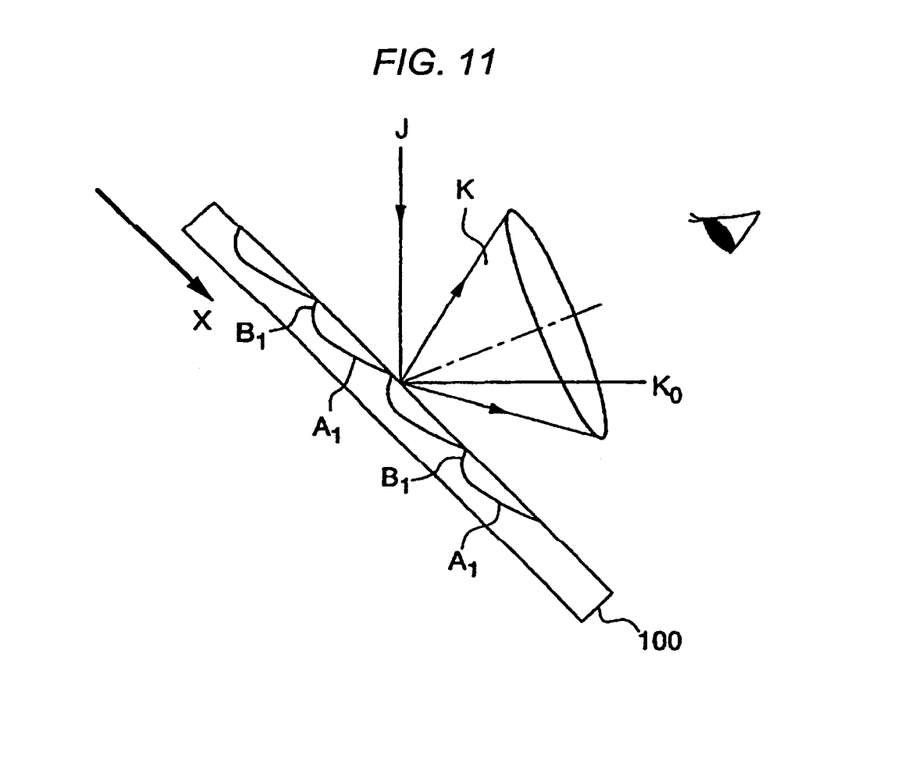
FIG. 11 is a view for explaining a state of usage of the reflective liquid crystal display device shown in FIG. 10.

FIG. 11 is a view explaining a state of usage of the liquid crystal display device 100. In FIG. 11, for the convenience of description, only the first and second delimiting lines $A_1$ and $B_1$ of the reflective liquid crystal display device 100 are illustrated and other components are omitted.

Such a reflective liquid crystal display device may be assembled into a portable telephone, a notebook personal computer, etc., with the x direction being disposed along the lower side. In this case, the reflective liquid crystal display device 100 is typically disposed or supported in a sloped manner on a horizontal plane, with the x direction being taken along the downwardly-sloped direction, as shown in FIG. 11. That is, in using it, in each of the concave portions, the second delimiting line $B_1$ is located above the first delimiting line as viewed from an observer's side. In addition, the observer typically views the reflective liquid crystal display device 100 from an upwardly sloped direction rather than from the horizontal direction.

In this case, since reflected light K corresponding to external light (incident light J), which is mainly incident from the upper side, is reflected mainly on a surface near the first delimiting line $a_1$, light is not easily reflected toward the observer's legs but is reflected mainly above the direction K0 of regular refection, as described with reference to FIG. 5.

For this reason, the observer's typical viewing range is coincident with the bright display range, so that a display device having high brightness in practice can be implemented.

Although the reflective liquid crystal display device of the embodiment shown in FIG. 10 comprises the reflector 1 as a different layer from the transparent electrode 116, the transparent electrode 116 itself may be used as the reflector 1. In addition, if the transparent electrode 116 is formed at the location of the reflector 1 shown in FIG. 10, the transparent electrode also functions as a reflector, so that the stacked structure of the reflective liquid crystal display device can be simplified.

In addition, if the reflector is formed with transflective film such as a half mirror or a transflective substrate, which is fabricated by providing reflective film with openings having a predetermined opening ratio, and an illuminating plate is disposed on the back plane of the liquid crystal panel, a transflective liquid crystal display device, which is used as a reflective type in the case of bright external light and as a transmissive type in the case of a dark external light can be implemented. It can be understood that the transflective liquid crystal display device is within the scope of the present invention.

In addition, if front light is provided at the side of the display plane of the display-side substrate 120, a front-light liquid crystal display device which utilizes only external light in the case of bright external light and which turns on front light in the case of dark external light can be implemented The liquid crystal driving method of the present invention is not particularly limited, and besides the aforementioned simple matrix type, a thin film transistor type, an active matrix type using a thin film diode, or a segment type may be adapted to the present invention.

As described above, according to the reflectors of the present invention, since a plurality of light-reflective concave portions are provided on the surface of the substrate, the concave portions are formed with the first and second curved surfaces (concave surfaces), and the deepest points of the concave portions are located on the first curved surface. Therefore, it is possible to improve light diffusibility and suppress a reflected image.

What is claimed is:

1. A reflector comprising:

a substrate; and a plurality of light-reflective concave portions formed on a surface of the substrate, wherein each of the concave portions is formed with a first curved surface located at one peripheral portion of the concave portion and a second curved surface located at an opposing peripheral portion thereof, and a deepest point of the concave portion is located on the first curved surface, a maximum value of an absolute value of tilt angle of the second curved surface to the surface of the substrate is larger than that of the first curved surface, each of the concave portions comprises a specific longitudinal section which passes through the deepest point of the concave portion, and the specific longitudinal section has an inner shape which is defined by a first delimiting line delimiting the first curved surface and a second delimiting line delimiting the second curved surface, the first delimiting line extends from one peripheral portion through the deepest point to a boundary between the first and second curved surfaces, the second delimiting line is continuous with the first delimiting line and extends from the boundary between the first and second curved surfaces to the opposing peripheral portion, and the maximum value of the absolute value of the tilt angle of the second delimiting line to the surface of the substrate is larger than that of the first delimiting line to the surface of the substrate.

2. The reflector according to claim 1, wherein a third curved surface is formed in the first curved surface, and a maximum value of an absolute value of a tilt angle of the third curved surface to the surface of the substrate is different from that of the first curved surface.

3. The reflector according to claim 2, wherein a third delimiting line delimiting the third curved surface dividing the first delimiting line is formed on the specific longitudinal section.

4. The reflector according to claim 3, wherein the third delimiting line is a concave curved line or a substantially straight line.

5. The reflector according to claim 3, wherein the maximum value of the absolute value of the tilt angle of the third delimiting line to the surface of the substrate is in a range between 5° and 20°.

6. The reflector according to claim 1, wherein the first delimiting line is a concave curved line and the second delimiting line is a concave curved line or a substantially straight line.

7. The reflector according to claim 1, wherein the maximum value of the absolute value of the tilt angle of the first delimiting line to the surface of the substrate is in a range between 4° and 35°.

8. The reflector according to claim 1, wherein the maximum value of the absolute value of the tilt angle of the second delimiting line to the surface of the substrate is in a range between 5° and 90°.

9. A liquid crystal display device equipped with the reflector according to claim 1.

10. A liquid crystal display device equipped with the reflector according to claim 1, wherein all of the specific longitudinal sections of the plurality of concave portions have the same direction, each of first delimiting lines is formed to align in a single direction, and the first delimiting line in each of the concave portions is located below the second delimiting line as viewed from an observer's side.

* * * * *